United States Patent
Wong et al.

(10) Patent No.: US 7,275,121 B1
(45) Date of Patent: Sep. 25, 2007

(54) SYSTEM AND METHOD FOR HARDWARE ASSISTED RESOURCE SHARING

(75) Inventors: Aron L. Wong, Mountain View, CA (US); Dhawal Kumar, Sunnyvale, CA (US); Mark S. Krueger, New Berlin, WI (US); Michael A. Ogrinc, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 249 days.

(21) Appl. No.: 11/100,025

(22) Filed: Apr. 5, 2005

(51) Int. Cl.
*G06F 12/00* (2006.01)
(52) U.S. Cl. ...................... 710/240; 710/241
(58) Field of Classification Search ........... 710/40–42, 710/45, 200, 220, 240, 241, 244; 713/2; 345/535, 541, 565
See application file for complete search history.

(56) References Cited

U.S. PATENT DOCUMENTS

| | | | | |
|---|---|---|---|---|
| 5,339,443 A | * | 8/1994 | Lockwood | 710/244 |
| 5,854,905 A | * | 12/1998 | Garney | 710/104 |
| 6,105,094 A | * | 8/2000 | Lindeman | 710/107 |
| 6,725,457 B1 | * | 4/2004 | Priem et al. | 718/104 |
| 6,880,077 B2 | * | 4/2005 | Saw-Chu et al. | 713/2 |
| 6,963,344 B1 | * | 11/2005 | Kasprzak et al. | 345/543 |
| 7,051,222 B2 | * | 5/2006 | Wyatt et al. | 713/323 |
| 7,062,615 B2 | * | 6/2006 | Miller et al. | 711/152 |
| 2006/0259674 A1 | * | 11/2006 | Dunstan et al. | 710/240 |

OTHER PUBLICATIONS

Intel Embedded Graphics Drivers and Video BIOS v. 6.1, Dec. 2006.*

* cited by examiner

*Primary Examiner*—Khanh Dang
(74) *Attorney, Agent, or Firm*—Patterson & Sheridan, LLP

(57) ABSTRACT

A system and method for managing access to a shared resource employs mutually exclusive flags. The flags enable arbitration between all applications requesting the use of the shared resource and ensure that each application has exclusive and continuous use of the shared resource. The preferred embodiment uses hardware to realize the flags and the flag arbitrating means. In one embodiment, the applications control and observe the flags through read/write registers. Alternative embodiments provide a unique read/write register for each application using the shared resource.

12 Claims, 4 Drawing Sheets

SYSTEM AND METHOD FOR HARDWARE ASSISTED RESOURCE SHARING

BACKGROUND OF THE INVENTION

1. Field of the Invention

This invention relates generally to resource sharing in computing devices and more specifically to a system and method for hardware assisted resource sharing.

2. Description of the Related Art

When two or more applications compete for a shared resource, unexpected outcomes may result. For example, consider a first software application and a second software application attempting to use a shared hardware resource. Both software applications may try to use the hardware simultaneously, and, if there is no arbitration between the applications, conflicts may arise. In another example, the second software application may interrupt the first software application and gain access to the hardware. In this case, the second software application may preempt the first software application and access the hardware through an interrupt service routine that is not visible to the first software application. During the interrupt service, the second software application may change one or more settings in the shared hardware resource that the first software application cannot detect, thereby causing unexpected results.

To further illustrate the conflict between two software applications, consider the typical operation of the display subsystem in a computer system. The operating system may make a system call to the Video Basic Input Output System (VBIOS) while a display driver is performing an operation. If the call to the VBIOS requires the use of a hardware resource that the display driver is in the process of modifying, a resource conflict results and at least one of the software applications will incorrectly perform its modifications.

To address the fact that software applications may disrupt one another, registers or buffers typically are used to pass state information about hardware resource usage. This practice requires hardware assistance and writeable memory, two items the VBIOS has difficulty accessing within its operating environment. Without hardware assistance, shared memory is error prone and subject to risk because there will always be the possibility that two software processes will attempt to modify the shared memory at nearly the same time, rendering the state information inaccurate.

As the foregoing illustrates, what is needed in the art is a way to more effectively share a resource between two or more clients.

SUMMARY OF THE INVENTION

One embodiment of the present invention sets forth a system for hardware assisted resource sharing. The system comprises a hardware resource that is shared by a first client and a second client and an arbiter that is coupled to the first client and to the second client. The arbiter is configured to arbitrate access to the shared hardware resource and includes a first flag associated with the first client and configured to have a first value or a second value, where the first value indicates that the first client may access the shared hardware resource, and a second flag associated with the second client and also configured to have the first value or the second value, where, again, the first value indicates that the second client may access the shared hardware resource.

To access the shared hardware resource, the first client sends a request to the arbiter to set the first flag to the first value, and the arbiter, upon receiving the request, determines whether to grant or deny the request based on whether the second flag is set to the first value or the second value.

One advantage of the disclosed system is that the flags enable arbitration between all applications requesting the use of the shared resource and ensure that each application has exclusive and continuous use of the shared resource. The preferred embodiment uses hardware to realize the flags and the flag arbitrating means. The system thus provides a simple and robust mechanism for shared hardware resource arbitration. Further, the system is designed to handle multiple resource arbiter flag sets.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
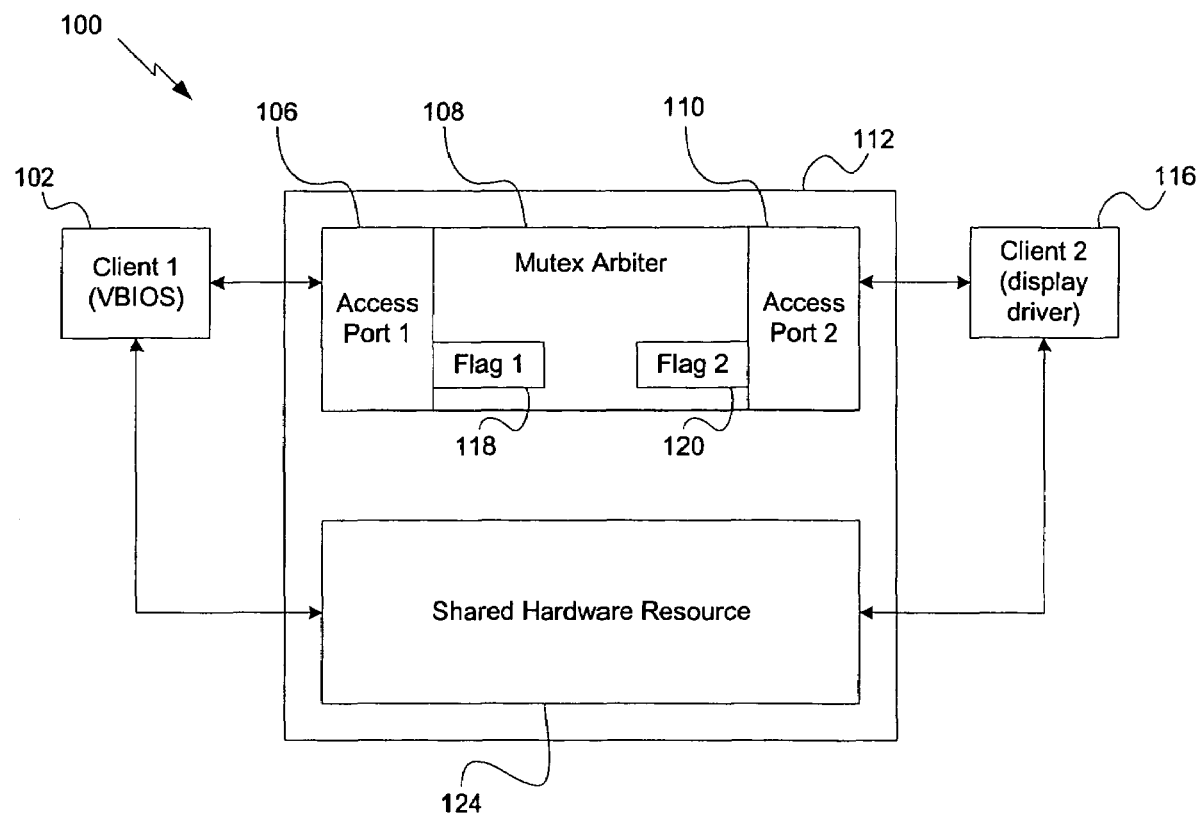
FIG. 1 is a conceptual diagram of a system that may be configured to implement hardware assisted resource sharing, according to one embodiment of the invention.

FIG. 1 is a conceptual diagram of a system 100 that may be configured to implement hardware assisted resource sharing, according to one embodiment of the invention. The system 100 includes, without limitation, a first client 102, a second client 116, and hardware 112. For the purposes of this exemplary discussion, the first client 102 represents a VBIOS software process and the second client 116 represents a display driver software process; however, the system and method described herein may be applied to any software processes.

The hardware 112 is comprised of a shared hardware resource 124 and a Mutex (MUTual EXclusion) arbiter 108. The shared hardware resource 124 may be, without limitation, any hardware resource which is accessed by more than one software process. The Mutex arbiter 108 is comprised of a first access port 106, a second access port 110, a first flag 118 and a second flag 120. The first client 102 is coupled to the first access port 106, which allows the first client 102 to communicate with the Mutex arbiter 108 and observe the first flag 118. The first client 102 is also coupled to the shared hardware resource 124. Similarly, the second client 116 is coupled to the second access port 110, which allows the second client 116 to communicate with the Mutex arbiter 108 and observe the second flag 120. The second client 116 is also coupled to the shared hardware resource 124. In one embodiment, both the first flag 118 and the second flag 120 are Boolean flags (i.e. they may take on the values of one or zero). The Mutex arbiter 108 determines whether the first client 102 or the second client 116 may access the shared hardware resource 124 by controlling the behavior of the first flag 118 and the second flag 120.

To access the shared hardware resource 124, the first client 102 initially checks the value of the first flag 118 through the first access port 106. If the value of the first flag 118 is one, then the first client 102 may access the shared hardware resource 124. If the value of the first flag 118 is zero, then the first client requests the Mutex arbiter 108 to set the first flag 118 to one. The Mutex arbiter 108 receives the request and sets the first flag 118 to one only if the value of the second flag 120 is zero. The first client 102 re-checks the value of the first flag 118 after the request to set the first flag 118 is sent. If the value of the first flag 118 is one, then the first client 102 may access the shared hardware resource 124. If the value of the first flag 118 is still zero, then the first client 102 repeats the request cycle by sending another request to the Mutex arbiter 108 to set the first flag 118 to one.

When the first client 102 has completed accessing the shared hardware resource 124, the first client 102 sends a request to clear the first flag 118 to zero. The Mutex arbiter 108 receives the request and clears the first flag 118 to zero, thereby enabling the second client 116 or other clients to access the shared hardware resource 124.

The second client 116 is connected to the second access port 110. The second client 116 behaves identically to the first client 102. The second client 116 can access the shared hardware resource 124 only if the value of the second flag 120 is one. If the second client 116 observes that the value of the second flag 120 is zero, then the second client 116 requests the Mutex arbiter 108 to set the second flag 120 to one. The Mutex arbiter 108 sets the second flag 120 to one only if the first flag 118 is set to zero. The second client 116 re-checks the value of the second flag 120 after the request to set the second flag 120 is sent. If the value of the second flag is one, then the second client 116 may access the shared hardware resource 124. If the value of the second flag 120 is still zero, then the second client 116 repeats the request cycle by sending another request to the Mutex arbiter to set the second flag 120 to one.

Again, similar to the actions of the first client 102, when the second client 116 has completed accessing the shared hardware resource 124, the second client 116 sends a request to clear the second flag 120 to zero. The Mutex arbiter 108 receives the request and then clears the second flag 120 to zero.

In one embodiment, the first access port 106 and the second access port 110 are realized with memory mapped registers. The first client 102 and the second client 116 request to set, to clear and to observe the first flag 118 and the second flag 120 by reading and writing these registers. In an alternative embodiment, the actual addresses of the first access port 106 and the second access port 110 may be mapped into memory managed address space, thereby further controlling client access to the access ports.

Alternative embodiments of the invention allow resource sharing between more than two clients. The addition of one flag and one access port to the Mutex arbiter accommodates one additional client. Any number of flags and ports may be added to accommodate any number of clients.

Figure 2:
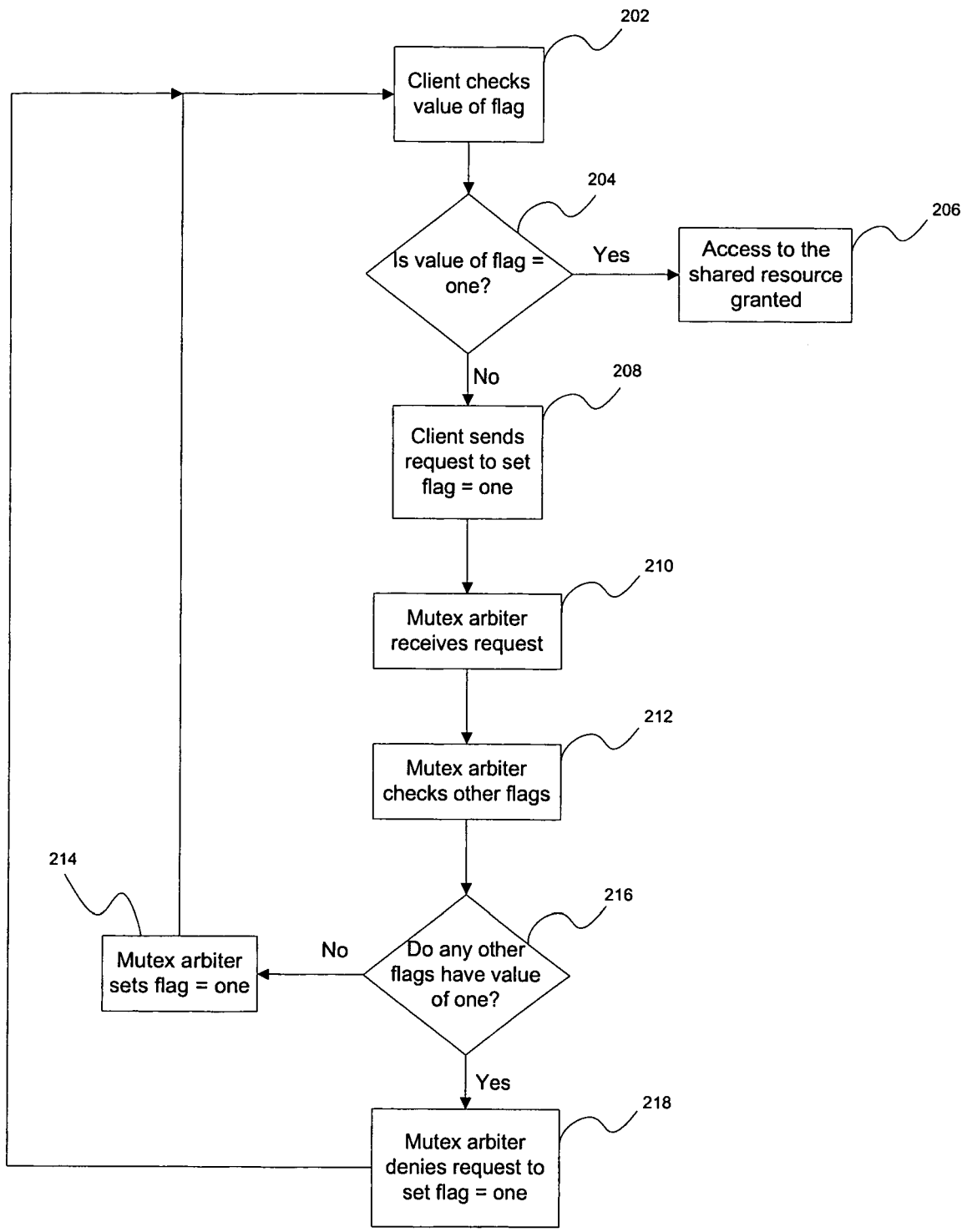
FIG. 2 is a flowchart of method steps for obtaining access to a shared hardware resource, according to one embodiment of the present invention.

FIG. 2 is a flowchart of method steps for obtaining access to a shared resource, according to one embodiment of the present invention. Persons skilled in the art will recognize that any system configured to perform the method steps in any order is within the scope of the invention.

As shown in FIG. 2, the method of obtaining access to a shared hardware resource 124 begins in step 202, wherein a client that wants access to the shared hardware resource 124 checks the value of a Boolean flag in the Mutex arbiter 108 that is associated with the client. In step 204, if the value of the flag is one, then, in step 206, access to the shared hardware resource 124 has been granted. If, however, the value of the flag is zero, then in step 208, the client sends a request to the Mutex arbiter 108 to set the flag to one. In step 210, the Mutex arbiter 108 receives the request and, in step 212, checks the value of the other flags within the Mutex arbiter 108. If, in step 216, the Mutex arbiter 108 finds no other flags set to one, then, in step 214, the flag associated with the requesting client is set to one, and the method returns to step 202. On the other hand, if the Mutex arbiter 108 determines that another flag is set to one, then, in step 218, the request to set the flag to one is denied. The method then returns to step 202, where the client will check the flag and optionally try to send another request.

Figure 3:
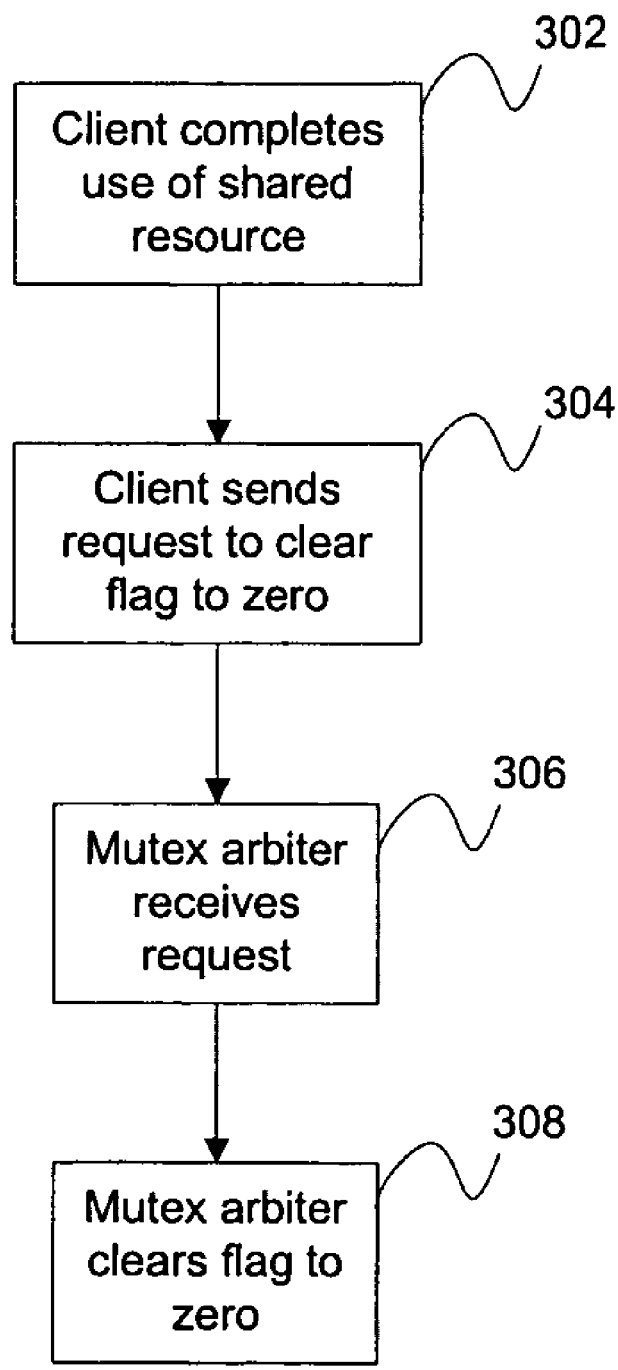
FIG. 3 is a flowchart of method steps for completing access of a shared hardware resource, according to one embodiment of the present invention.

FIG. 3 is a flowchart of method steps for completing access of a shared hardware resource, according to one embodiment of the present invention. Persons skilled in the art will recognize that any system configured to perform the method steps in any order is within the scope of the invention.

As shown in FIG. 3, the method for completing the access of a shared hardware resource 124 begins in step 302, wherein a client completes the use of the shared hardware resource. In step 304, the client sends a request to the Mutex arbiter 108 to clear the flag associated with the client to zero. In step 306, the Mutex arbiter 108 receives the request, and, in step 308, the Mutex arbiter 108 clears the flag associated with the requesting client to zero.

As can be seen from the foregoing discussion, a first client follows the method of FIG. 2 to access the shared resource. The shared resource becomes unavailable to other clients for the entire duration of use by the first client. Thus, an advantage of the disclosed system and method is that the first client enjoys exclusive and continuous use of the shared resource, free of interruption by any other client. After using the shared resource, the first client follows the method of FIG. 3 to enable access of the shared resource by other clients.

Figure 4:
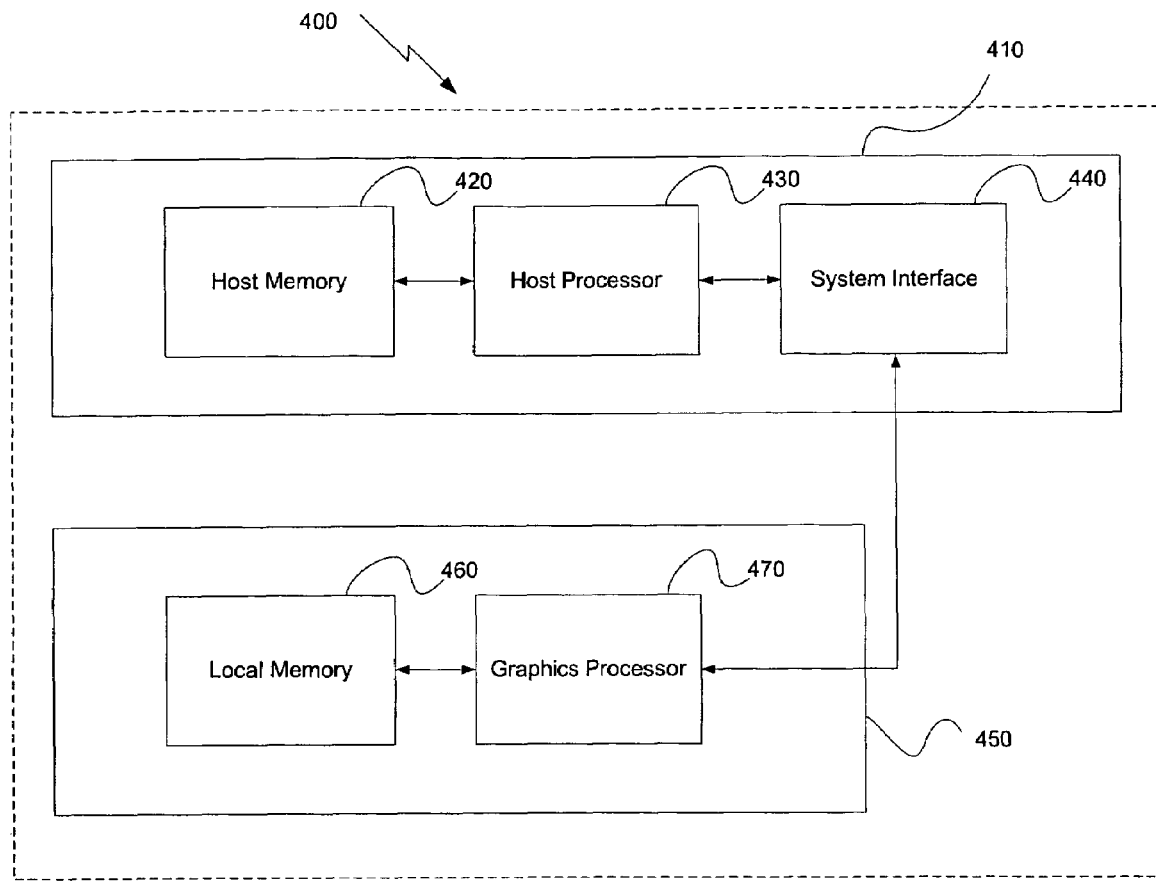
FIG. 4 is a conceptual diagram of a computing system configured to implement one or more aspects of the present invention

FIG. 4 is a conceptual diagram of a computing system 400 configured to implement one or more aspects of the present invention. As shown, a computing system 400 may include, without limitation, a host computer 410 and a graphics subsystem 450. The computing system 400 may be a desktop computer, server, laptop computer, palm-sized computer, tablet computer, game console, cellular telephone, computer based simulator or the like. The host computer 410 includes a host processor 430 which may be a CPU or other special purpose processing unit. The host processor 430 may be used to execute software elements such as the clients described above in conjunction with FIGS. 1-3 and is coupled to a host memory 420 which may be used to store data and programs. The host processor 430 is further coupled to a system interface 440 which may be a bridge device or an input/output interface.

The host computer 410 communicates to the graphics subsystem 450 via the system interface 440. The graphics subsystem 450 includes a graphics processor 470 coupled to local memory 460. The graphics processor 470 uses graphics memory to store graphics data and program instructions. Graphics memory may include local memory 460, host memory 420, register files within the graphics processor and the like.

In one embodiment, the graphics processor 470 is configured to implement the functionality of the Mutex arbiter 108 of FIG. 1. In an alternative embodiment, the functionality of the Mutex arbiter 108 may be implemented in the host processor 430, instead. In yet other alternative embodiments, the functionality of the Mutex arbiter 108 may be implemented in other sections of either the graphics subsystem 450 or the host computer 410, as the case may be.

While the foregoing is directed to embodiments of the present invention, other and further embodiments of the invention may be devised without departing from the basic scope thereof, and the scope thereof is determined by the claims that follow.

The invention claimed is:

1. A system for hardware-assisted resource sharing, the system comprising:
   a hardware resource shared by a first client comprising a video basic input/output system and a second client comprising a display driver; and
   an arbiter coupled to the first client and to the second client and configured to arbitrate access to the shared hardware resource, wherein the arbiter includes:
      a first flag associated with the first client and configured to have a first value or a second value, wherein the first value indicates that the first client may access the shared hardware resource, and
      a second flag associated with the second client and also configured to have the first value or the second value, wherein the first value indicates that the second client may access the shared hardware resource,
   wherein, to access the shared hardware resource, the first client sends a first request to the arbiter to set the first flag to the first value, and the arbiter, upon receiving the first request, determines whether to grant or deny the first request based on whether the second flag is set to the first value or the second value.

2. The system of claim 1, wherein the arbiter grants the first request, setting the first flag to the first value, if the second flag is set to the second value.

3. The system of claim 2, wherein the first client checks the value of the first flag to determine that the first flag has been set to the first value.

4. The system of claim 3, wherein the first client accesses the shared hardware resource, if the first flag is set to the first value.

5. The system of claim 4, wherein the first client sends a second request to the arbiter to set the first flag to the second value after the first client is done accessing the shared resource.

6. The system of claim 5, wherein the arbiter receives the second request and sets the first flag to the second value.

7. The system of claim 1, wherein the arbiter denies the first request, if the second flag is set to the first value.

8. The system of claim 7, wherein the first client sends a second request to the arbiter to set the first flag equal to the first value, if the arbiter denies the first request.

9. The system of claim 1, wherein the first client is coupled to the arbiter through a first access port and the second client is coupled to the arbiter through a second access port.

10. The system of claim 9, wherein the first and second access ports comprise memory-mapped registers.

11. The system of claim 9, wherein addresses of the first and second access ports are mapped into memory-managed address space.

12. A computing system configured for hardware-assisted resource sharing, the computing system comprising:
   a hardware resource shared by a first client comprising a video basic input/output system and a second client comprising a display driver; and
   a processor having an arbiter that is coupled to the first client and to the second client and is configured to arbitrate access to the shared hardware resource, wherein the arbiter includes:
      a first flag associated with the first client and configured to have a first value or a second value, wherein the first value indicates that the first client may access the shared hardware resource, and
      a second flag associated with the second client and also configured to have the first value or the second value, wherein the first value indicates that the second client may access the shared hardware resource,
   wherein, to access the shared hardware resource, the first client sends a first request to the arbiter to set the first flag to the first value, and the arbiter, upon receiving the first request, determines whether to grant or deny the first request based on whether the second flag is set to the first value or the second value.

* * * * *